(12) United States Patent
Sumida et al.

(10) Patent No.: US 12,300,406 B2
(45) Date of Patent: May 13, 2025

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Shintaro Sumida, Mie (JP); Motohiro Yokoi, Mie (JP); Kenta Ito, Mie (JP); Suguru Yasuda, Mie (JP); Tetsuya Nishimura, Mie (JP); Hitomi Harada, Mie (JP); Haruka Nakano, Mie (JP); Ryusuke Kudo, Mie (JP); Hiroki Hirai, Mie (JP); Housei Mizuno, Mie (JP); Hidetoshi Ishida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/612,433

(22) PCT Filed: May 13, 2020

(86) PCT No.: PCT/JP2020/019062
§ 371 (c)(1),
(2) Date: Nov. 18, 2021

(87) PCT Pub. No.: WO2020/241255
PCT Pub. Date: Dec. 3, 2020

(65) Prior Publication Data
US 2022/0246325 A1    Aug. 4, 2022

(30) Foreign Application Priority Data
May 31, 2019   (JP) .................. 2019-102409

(51) Int. Cl.
*H01B 7/36* (2006.01)
*B60R 16/02* (2006.01)
(Continued)

(52) U.S. Cl.
CPC .......... *H01B 7/36* (2013.01); *B60R 16/0215* (2013.01); *H01B 7/0045* (2013.01); *H01B 7/0823* (2013.01)

(58) Field of Classification Search
CPC ........ H01B 7/36; H01B 7/0045; H01B 7/823; H01B 7/365; H01B 7/08; B60R 16/0207;
(Continued)

(56) References Cited

U.S. PATENT DOCUMENTS 4,065,199 A * 12/1977 Andre ...................... H01B 7/08
                                                          174/72 A
4,422,700 A * 12/1983 Krenz ................ H01R 13/6582
                                                          439/97

(Continued)

FOREIGN PATENT DOCUMENTS

CN     103682763 A  *  3/2014    ............ H01R 13/16
CN     104604058        5/2015

(Continued)

OTHER PUBLICATIONS

International Search Report issued in International Patent Application No. PCT/JP2020/019062, dated Aug. 4, 2020, along with an English translation thereof.

(Continued)

*Primary Examiner* — Paresh Paghadal
(74) *Attorney, Agent, or Firm* — GREENBLUM & BERNSTEIN, P.L.C.

(57) ABSTRACT

A wiring member includes: a flat wiring member including a plurality of terminal parts; and a plurality of identification parts provided to correspond to some of the plurality of (Continued)

terminal parts, wherein the plurality of identification parts are made to each provide a piece of identification information different from each other, the flat wiring member can change a form between a folding form of being folded and a developed form of extending larger than the folding form, and the plurality of identification parts are provided in the flat wiring member so that a distribution region of the plurality of identification parts in the folding form is smaller than a distribution region of the plurality of identification parts in the developed form.

1 Claim, 9 Drawing Sheets

(51) Int. Cl.
  *H01B 7/00* (2006.01)
  *H01B 7/08* (2006.01)
(58) Field of Classification Search
  CPC ............ B60R 16/2015; H05K 2201/05; H05K 2201/052; H05K 2201/055; H05K 2201/09936; H05K 2201/09927
  See application file for complete search history.

(56) References Cited

U.S. PATENT DOCUMENTS

| | | | | |
|---|---|---|---|---|
| 4,808,771 A * | 2/1989 | Orr, Jr. | .................. | H01B 7/083 |
| | | | | 174/117 M |
| 5,661,453 A * | 8/1997 | Justus | ................. | B60R 16/0215 |
| | | | | 340/457.1 |
| 10,069,254 B1 * | 9/2018 | Lin | ........................ | H01R 13/72 |
| 10,109,938 B2 * | 10/2018 | Whatcott | ............... | H01R 12/62 |
| 10,188,307 B2 * | 1/2019 | Henson | ................ | A61B 5/6831 |
| 2002/0028600 A1 * | 3/2002 | Kondo | ................... | H05K 1/118 |
| | | | | 439/502 |
| 2003/0102148 A1 * | 6/2003 | Ohara | ..................... | H01B 7/08 |
| | | | | 174/117 F |
| 2005/0183589 A1 * | 8/2005 | Salmon | ................ | H05K 3/0014 |
| | | | | 101/3.1 |
| 2007/0089900 A1 * | 4/2007 | Mitamura | .............. | H05K 1/028 |
| | | | | 174/254 |
| 2009/0314515 A1 * | 12/2009 | Bevirt | ..................... | H01B 7/40 |
| | | | | 174/110 R |
| 2009/0314516 A1 * | 12/2009 | Chang | .................. | H01B 7/0892 |
| | | | | 174/117 F |
| 2010/0170692 A1 * | 7/2010 | Lu | ......................... | H05K 1/028 |
| | | | | 174/69 |
| 2010/0294556 A1 * | 11/2010 | Chuo | .................... | H05K 1/028 |
| | | | | 174/268 |
| 2011/0164371 A1 * | 7/2011 | McClure | ............... | G06F 1/1613 |
| | | | | 29/829 |
| 2012/0090879 A1 * | 4/2012 | Lai | ......................... | H05K 1/028 |
| | | | | 174/254 |
| 2012/0242364 A1 * | 9/2012 | Ohmayer | .............. | H05K 1/028 |
| | | | | 324/756.05 |
| 2014/0332264 A1 * | 11/2014 | Chen | ....................... | H01B 7/06 |
| | | | | 174/70 R |
| 2015/0008012 A1 * | 1/2015 | Sasaki | ................... | H01B 3/306 |
| | | | | 174/117 F |
| 2015/0175097 A1 | 6/2015 | Inao et al. | | |
| 2016/0025311 A1 * | 1/2016 | Tischler | .................. | H01L 33/62 |
| | | | | 29/829 |
| 2016/0103169 A1 * | 4/2016 | Nakajima | .......... | G06K 19/0723 |
| | | | | 324/538 |
| 2018/0054883 A1 * | 2/2018 | Yeh | ....................... | H05K 1/189 |
| 2018/0118293 A1 | 5/2018 | Kato | | |
| 2018/0358750 A1 | 12/2018 | Miyamura et al. | | |
| 2021/0360814 A1 * | 11/2021 | Hong | ................... | G06F 1/1681 |

FOREIGN PATENT DOCUMENTS

| | | | | |
|---|---|---|---|---|
| CN | 108432063 | | 8/2018 | |
| EP | 1153801 | | 11/2001 | |
| JP | 62-82607 | | 4/1987 | |
| JP | 5-204459 | | 8/1993 | |
| JP | 6-23123 | | 3/1994 | |
| JP | 7-176216 | | 7/1995 | |
| JP | 7-201227 | | 8/1995 | |
| JP | 2001-216846 | | 8/2001 | |
| JP | 2001-256846 | | 9/2001 | |
| JP | 2002-25352 | | 1/2002 | |
| JP | 2002-373529 | | 12/2002 | |
| JP | 2016134958 A | * | 7/2016 | ............... H02G 3/04 |
| JP | 2018050036 A | * | 3/2018 | ........... H05K 1/0218 |
| KR | 20140050381 A | * | 4/2014 | ............... H01B 7/06 |
| WO | 2016/159040 | | 10/2016 | |

OTHER PUBLICATIONS

Japan Office Action received in JP Application No. 2019-102409, dated Sep. 27, 2022.
China, Office Action issued in CN Application No. 202080039410.0, dated Jun. 21, 2024.
China Office Action received in CN Application No. 202080039410.0, dated Jan. 24, 2025, and English translation thereof.

* cited by examiner

F I G 8
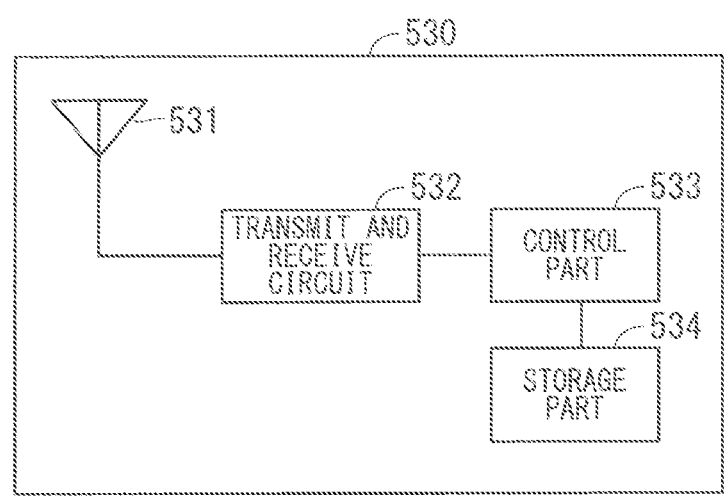

WIRING MEMBER

TECHNICAL FIELD

The present disclosure relates to a wiring member.

BACKGROUND ART

Patent Document 1 discloses a flat cable made up of a plurality of conductor wires parallel to each other covered by an insulating material. In this flat cable, an identification mark for identifying a direction of fixing a connector terminal is formed on the insulating material on an end portion of the cable.

Patent Document 2 discloses a technique of performing a connector connecting operation by a robot.

PRIOR ART DOCUMENTS

Patent Documents

Patent Document 1: Japanese Patent Application Laid-Open No. 2001-256846
Patent Document 2: Japanese Patent Application Laid-Open No. 5-204459

SUMMARY

Problem to be Solved by the Invention

A harness including a plurality of terminals is connected to various types of apparatus via a connector. Each terminal is desired to be accurately identified to accurately connect each terminal to a corresponding apparatus.

Accordingly, an object of the present disclosure is to provide a technique capable of easily recognizing a terminal part of a flat wiring member.

Means to Solve the Problem

A wiring member according to the present disclosure is a wiring member including: a flat wiring member including a plurality of terminal parts; and a plurality of identification parts provided to correspond to at least two of the terminal parts in the plurality of terminal parts, wherein the plurality of identification parts are made to each provide a piece of identification information different from each other, the flat wiring member can change a form between a folding form in which at least a part of the flat wiring member is folded and a developed form in which a folding part of the folding form is developed, and the plurality of identification parts are provided in the flat wiring member so that a distribution region of the plurality of identification parts in the folding form is smaller than a distribution region of the plurality of identification parts in the developed form.

Effects of the Invention

According to the present disclosure, the terminal part of the flat wiring member is recognized easily.

BRIEF DESCRIPTION OF DRAWINGS

FIG. 8 is a block diagram illustrating an identification part according to the fifth modification example.

DESCRIPTION OF EMBODIMENT(S)

Description of Embodiment of Present Disclosure

Figure 1:
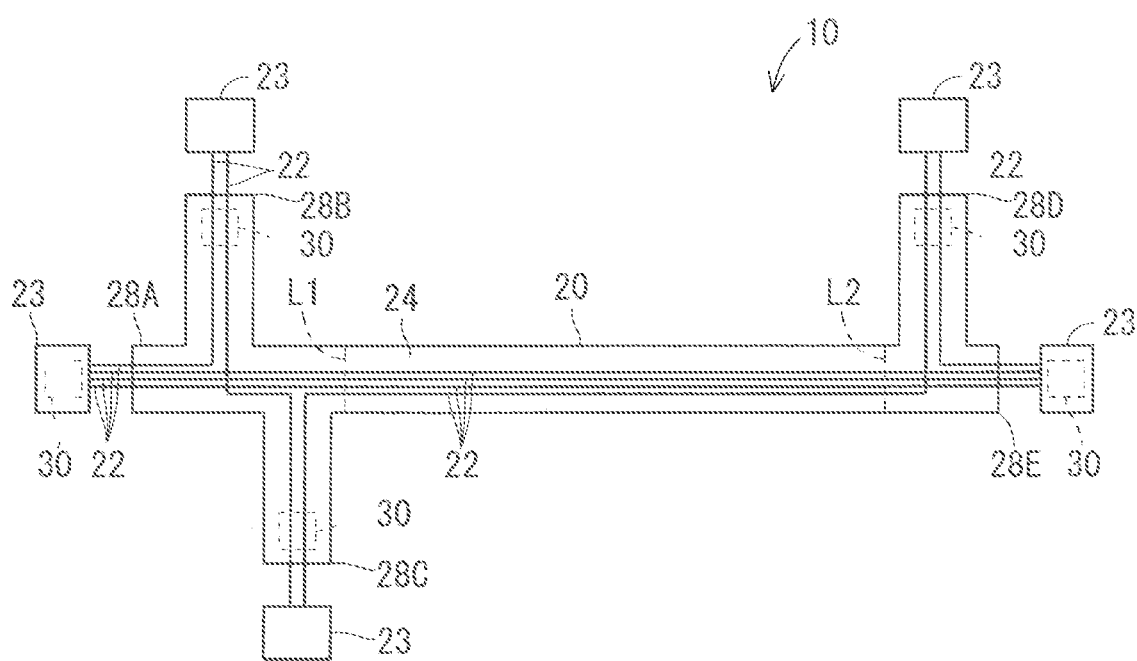
FIG. 1 is a plan view illustrating a wiring member.

Embodiments of the present disclosure are listed and described firstly.

A wiring member according to the present disclosure is as follows.

(1) A wiring member includes: a flat wiring member including a plurality of terminal parts; and a plurality of identification parts provided to correspond to at least two of the terminal parts in the plurality of terminal parts, wherein the plurality of identification parts are made to each provide a piece of identification information different from each other, the flat wiring member can change a form between a folding form in which at least a part of the flat wiring member is folded and a developed form in which a folding part of the folding form is developed, and the plurality of identification parts are provided in the flat wiring member so that a distribution region of the plurality of identification parts in the folding form is smaller than a distribution region of the plurality of identification parts in the developed form. The identification is performed using the plurality of identification parts in the relatively narrow distribution region, thus the terminal part of the flat wiring member is easily recognized.

(2) The developed form may be a form extending larger than the folding form. Accordingly, the terminal part of the flat wiring member is easily recognized in a form folded relatively small.

(3) The plurality of identification parts may be marks which can be captured as images different from each other by a camera. Image recognition processing, for example, is performed on the image captured by the camera to identify the terminal part.

(4) The plurality of marks may have an identical posture in the folding form. Accordingly, the terminal part is identified more easily in the folding form of the wiring member. The images of the plurality of marks may be simultaneously captured.

(5) The plurality of marks may be provided in positions observable from an identical surface side in the folding form. Accordingly, the plurality of marks can be easily observed in the folding form of the wiring member. The images of the plurality of marks may be simultaneously captured.

(6) In the folding form, the flat wiring member may include a portion bended along a line inclined with respect to a width direction of the flat wiring member. Accordingly, an overlapped portion can be reduced in the form in which the flat wiring member is folded, thus the mark is easily exposed.

(7) The folding form is a form in which another portion is folded on a base portion, and a base identification part may be provided in the base portion. Accordingly, the base portion can be easily recognized. A development operation of developing the other portion, for example, can be easily performed based on the base portion.

(8) The plurality of identification parts may include order information. Accordingly, development of the terminal part and a connection operation, for example, are smoothly performed in accordance with the order information.

(9) The plurality of identification parts may include identification information provided by edge shapes of the plurality of terminal parts. Accordingly, pieces of identification information different from each other are provided by the edge shape of the terminal part.

DETAILS OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
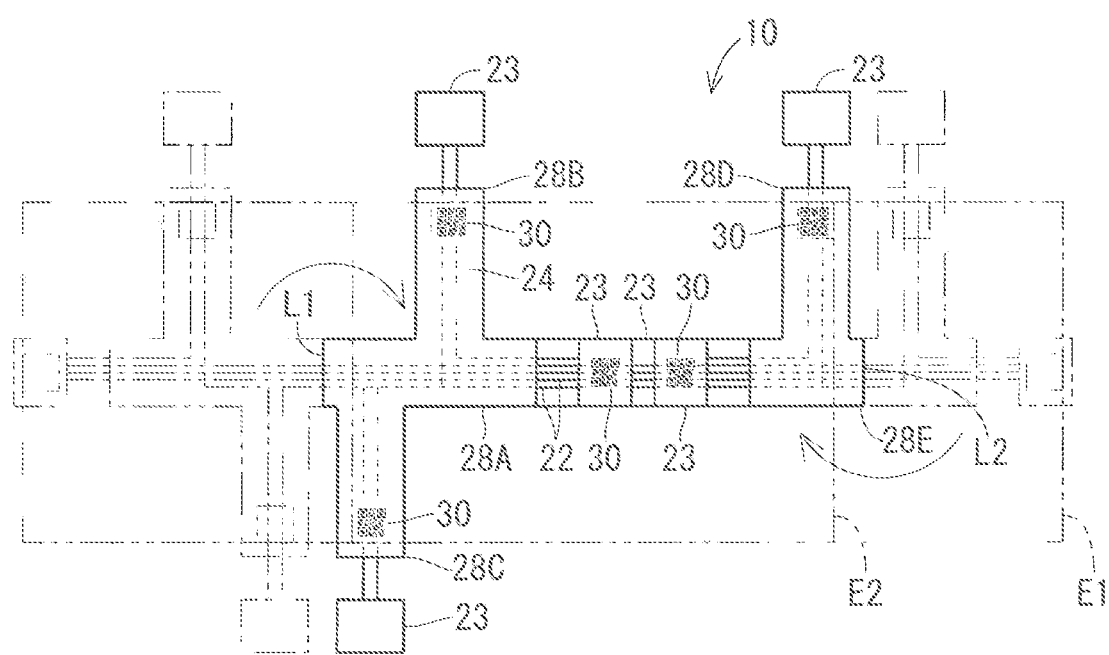
FIG. 2 is a plan view illustrating the wiring member.

A wiring member according to an embodiment is described hereinafter. FIG. 1 and FIG. 2 are plan views each illustrating a wiring member 10. FIG. 1 illustrates the wiring member 10 in a developed form. FIG. 2 illustrates the wiring member 10 in a folding form. The wiring member 10 in the developed form is a form in which the wiring member 10 is mounted to a vehicle, for example. The wiring member 10 is fixed to the vehicle in this state. Terminal parts 28A, 28B, 28C, 28D, and 28E are connected to various types of apparatus in the vehicle via a connector 23 in an end portion. The wiring member 10 in the folding form is a form for housing and transporting the wiring member 10, for example. For example, the wiring member 10 is transported in the folding form and disposed near the vehicle which is an assembly target. Then, the wiring member 10 remaining in the folding form is disposed on the assembly target of the vehicle, and developed on the assembly target.

The wiring member 10 includes a flat wiring member 20 and a plurality of identification parts 30.

The flat wiring member 20 is a flat harness in which a plurality of wire-like transmission members are collected in a form having the plurality of terminal parts 28A, 28B, 28C, 28D, and 28E. The flat wiring member 20 includes a plurality of electrical wires 22 and a sheet 24 herein.

The electrical wire 22 is an example of a wire-like transmission member. The electrical wire 22 includes a core wire and a covering. The core wire is a wire-like conductor formed by a metal conductive member, for example. The covering is an insulating part covering around the core wire. It is sufficient that the wire-like transmission member is a wire-like member transmitting an electrical power or light, for example. For example, the wire-like transmission member may be a bare conductive wire, a shielded wire, a twisted wire, an enamel wire, a nichrome wire, or an optical fiber in addition to the electrical wire.

The sheet 24 is a sheet-like member keeping the plurality of electrical wires 22 in a flat form. The sheet 24 is formed of resin, for example. The sheet 24 may include metal. The sheet 24 may include a non-woven sheet. The plurality of electrical wires 22 are branched and fixed to the one main surface of the sheet 24 in a parallel state. The electrical wire 22 is fixed to the sheet 24 by welding, bonding, or adhesion, for example. The welding may be ultrasonic welding or thermal welding. The plurality of electrical wires 22 are fixed to the one main surface of the sheet 24, thereby being kept in a flat state.

The flat wiring member 20 may be branched in accordance with a position of each electrical component to which the flat wiring member 20 is connected. Illustrated herein is an example that the plurality of electrical wires 22 are branched at a plurality of positions (three positions herein). In this case, the sheet 24 may be formed to be branched along a branch route. A portion where a largest number of electrical wires 22 are provided in the flat wiring member 20 may be referred to as a main wire part. A portion where the electrical wires 22 are branched from the main wire part may be referred to as a branch wire part. A cover may be attached to the sheet 24 from a side of the electrical wire 22.

A connector 23 is attached to end portions of the plurality of electrical wires 22. Herein, the electrical wire 22 extends from an end portion of the sheet 24 in both end portions of the main sire part and an end portion of the branch wire part. A terminal is attached to the end portion of the electrical wire 22 extending from the end portion of the sheet 24, and the terminal is inserted into a cavity of the connector 23. The connectors may be fixed to the end portion of the sheet. In this case, the electrical wire 22 may not extend from the end portion of the sheet 24.

In the present embodiment, the terminal parts 28A, 28B, 28C, 28D, and 28E are provided on both end of the main wire part and end portions of the plurality of branch wire parts. The terminal parts 28A, 28B, 28C, 28D, and 28E may be considered to include the end portion of the sheet 24, the end portion of the electrical wire 22 disposed along the end portion of the sheet 24, and the connector 23 to which the end portion of the electrical wire 22 is connected.

The example of the flat wiring member 20 is not limited to the above example. The plurality of electrical wires may be kept in a flat state by a flat frame member, for example. The plurality of electrical wires may be directly joined in parallel to be in a flat form. The flat wiring member 20 may be kept in a flat state so that a plurality of wire-like conductors are insulated from each other by an insulating member such as a flexible printed circuit (EPC) or a flexible flat cable (FFC), for example. That is to say, it is sufficient that the flat wiring member is a wiring member in which a plurality of wire-like conductors are held in a flat form in a state of being insulated from each other and formed so that a thickness thereof is smaller than a width thereof as a whole. The flat wiring member needs not have a branch wire part.

At least a part of the flat wiring member 20 is folded in the folding form. The folded portion in the folding form is developed in the developed form. The flat wiring member 20 in the developed form extends larger than the flat wiring member 20 in the folding form. Conversely, the flat wiring member 20 in the folding form occupies a region smaller than the flat wiring member 20 in the developed form.

Herein, the main wire part of the flat wiring member 20 is bended at a plurality of positions (two positions herein). Two bended positions L1 and L2 are located in positions away from each other in a longitudinal direction of the main wire part. One bended position L1 is located closer to one end of the main wire part, and more specifically, located closer to a center of the main wire part in the longitudinal direction in relation to the terminal part 28C. The other one bended position L2 is located closer to the other one end of the main wire part, and more specifically, located closer to a center of the main wire part in the longitudinal direction in relation to the terminal part 28E. Thus, both end side portions of the main wire part in the flat wiring member 20 are folded to a center side in the folding form. Accordingly, the flat wiring member 20 is relatively small in the folding form. Herein, the both end side portions of the main wire part are folded so as not to overlap with each other in the flat wiring member 20. The bended position may be considered a position having low rigidity in the flat wiring member 20, for example. For example, the bended position may be a position having a small thickness in the flat wiring member 20. The bended position may be considered as a position where a fold line is located in the flat wiring member 20.

The plurality of identification parts 30 are provided to correspond to some of the plurality of terminal parts 28A, 28B, 28C, 28D, and 28E. Herein, the plurality of identification parts 30 are provided to correspond to all of the plurality of terminal parts 28A, 28B, 28C, 28D, and 28E. The plurality of identification parts may be provided to correspond to at least two, which is some of the plurality of terminal parts.

The plurality of identification parts 30 have a configuration of providing pieces of identification information different from each other. The identification information may be provided as information which can be identified by a human sense or information which can be identified by a device. The information which can be identified by the device may be information captured as images different from each other by a camera, for example. In this case, the captured image may be identified by image recognition processing such as pattern matching processing. The information which can be identified by the device may be information provided via wireless communication, for example.

Described in the present embodiment is a case where the plurality of identification parts 30 are two-dimensional codes. The two-dimensional code is an identification display having information in a two-dimensional direction by dots, for example. A QR code (registered trademark), for example, can be used as the identification part 30. The plurality of identification parts 30 may be a one-dimensional bar code, for example. The plurality of identification parts 30 include pieces of identification information different from each other. The identification information includes numbers and alphabets for distinguishing each of the terminal parts 28A, 28B, 28C, 28D, and 28E. When an order of connecting the terminal parts 28A, 28B, 28C, 28D, and 28E to an apparatus is determined, the identification information may include order information. The identification part 30 may include type information (whether the terminal part is always connected to the apparatus regardless of a type of vehicle and presence or absence of an option or whether or not the terminal part is connected to the apparatus in accordance with the type of vehicle and presence or absence of the option, for example) of the terminal parts 28A, 28B, 28C, and 28D. The identification part 30 may include a type (part number information) of the wiring member 10, for example.

When the wiring member 10 is handled, a human or a robot, for example, reads out the identification part 30 described above using a cord reading device, thus the terminal parts 28A, 28B, 28C, 28D, and 28E are distinguished and recognized.

Herein, the identification part 30 is made up of a label in which a two-dimensional code is printed on one surface of a base material and an adhesive surface is formed on the other surface, for example. The identification part 30 is attached to one surface of the sheet 24 or the connector 23 in the terminal parts 28A, 28B. 28C, 28D, and 28E. The identification part 30 may be attached to the sheet 24 from an upper side of the electrical wire 22. When a cover is attached to the sheet 24, the identification part 30 may be attached to the cover. The identification part 30 may be directly printed on the connector 23 or the sheet 24 by laser printing, for example. The identification part 30 may be provided in a center of the sheet 24 or the connector 23 in a width direction or a position closer to one side in the width direction. The other example of the identification part 30 is also described in a modification example described hereinafter.

The plurality of identification parts 30 are provided in the flat wiring member 20 so that a distribution region E2 of the plurality of identification parts 30 in the folding form is smaller than a distribution region E1 of the plurality of identification parts 30 in the developed form. When the flat wiring member 20 is bended at the bended positions L1 and L2, the terminal parts 28A, 28B, and 28C and the terminals parts 28D and 28E get close to each other. Thus, a region where the terminal parts 28A, 28B, 28C, 28D, and 28E extend in the developed form is larger than a region where the terminal parts 28A, 28B, 28C, 28D, and 28E extend in the folding form. An arrangement relationship between the terminal parts 28A, 28B, and 28C is not changed between the developed form and the folding form herein. Similarly, an arrangement relationship between the terminal parts 28D and 28E is not also changed.

Herein, the identification part 30 is attached to an end portion of the sheet 24 or the connector 23 in the terminal parts 28A, 28B, 28C, 28D, and 28E. In FIG. 1 and FIG. 2, the identification part 30 is provided in the connector 23 in the terminal parts 28A and 28E. The identification part 30 is provided on the end portion of the sheet 24 in the terminal parts 28B, 28C, and 28D. Thus, the distribution region E1 of the identification part 30 in the developed form is larger than the distribution region E2 of the identification part 30 in the folding form. The distribution regions E1 and E2 may be considered a minimum quadrangular region including the plurality of identification parts 30, for example.

The plurality of identification parts 30 may have the same posture in the folding form. In the example illustrated in FIG. 2, the plurality of identification parts 30 have the same posture in the folding form. Thus, when the images of the plurality of identification parts 30 are simultaneously captured, the plurality of identification parts 30 are observed in an aligned direction. The posture of the identification part 30 in the developed form is determined so that the plurality of identification parts 30 have the same postured in the folding form.

The plurality of identification parts 30 may be provided in positions observable from the same surface side in the folding form. In the example illustrated in FIG. 2, the plurality of identification parts 30 are provided in positions observable from a bended surface side in the folding form. Herein, a surface on a side on which the identification part 30 (a front surface in FIG. 2) is observed in the folding form is defined as an observation surface. Herein, the both end portions of the flat wiring member 20 are bended at one position in each of the bended positions L1 and L2. Thus, the identification part is provided on a surface on a side opposite to the observation surface described above on the terminal parts 28A, 28B, 28C, 28D, and 28E.

According to the present embodiment, the plurality of identification parts 30 are provided to correspond to some of the plurality of terminal parts 28A, 28B, 28C. 28D, and 28E. The distribution region E2 of the plurality of identification parts 30 are narrowed in a form in which the flat wiring member 20 is folded. Thus, when the relatively small distribution region E2 is observed in a state where the flat wiring member 20 is folded, the plurality of terminal parts 28A, 28B, 28C, 28D, and 28E are recognized. For example, when the image of the relatively small distribution region E2 is captured by a camera, the plurality of terminal parts 28A, 28B, 28C, 28D, and 28E can be recognized using a captured image. Thus, the plurality of terminal parts 28A, 28B, 28C, 28D, and 28E of the flat wiring member 20 are recognized easily.

When the plurality of terminal parts 28A, 28B, 28C, 28D, and 28E of the flat wiring member 20 are recognized, development and a connection operation of the plurality of terminal parts 28A, 28B, 28C, 28D, and 28E can be easily performed by the robot, for example.

When the plurality of identification parts 30 are marks which can be captured as images different from each other by a camera such as a two-dimensional code, image recognition processing, for example, is performed on the captured images to be able to identify the terminal parts 28A, 28B, 28C, 28D, and 28E.

The plurality of identification parts 30 have the same posture in the folding form. Thus, performed easily in the folding form is processing of capturing the images of the plurality of identification parts 30 simultaneously to identify each identification part 30 by image processing, for example.

The plurality of identification parts 30 are observed from the same surface side of the plurality of identification parts 30 in the folding form. Thus, the plurality of identification parts 30 can be simultaneously observed easily in the folding form.

When the plurality of identification parts 30 have the order information, an operation according to the order information is performed easily. For example, when the terminal parts 28A, 28B, 28C, 28D, and 28E are developed from the folding form, an operation of connecting the terminal part to an apparatus, for example, are smoothly performed.

Modification Example

Various modification examples are described based on a premise of the embodiment described above.

Figure 3:
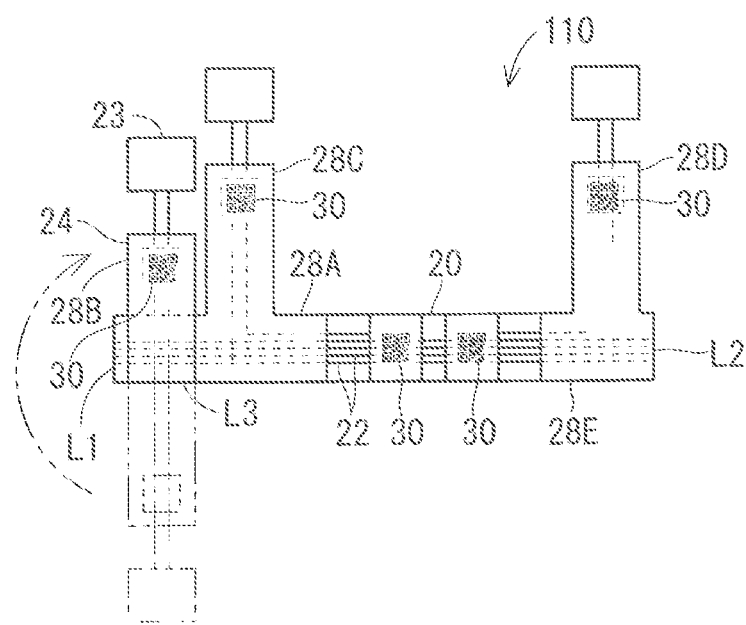
FIG. 3 is a plan view illustrating a wiring member according to a first modification example.

In a wiring member 110 according to a first modification example illustrated in FIG. 3, the terminal part 28C is further bended along a bended position L3 in a direction intersecting with (herein, perpendicular to) the bended positions L1 and L2 in addition to the folding form illustrated in FIG. 2. Thus, the identification part 30 corresponding to the terminal par 28C gets close to the identification part 30 corresponding to the terminal part 28B, for example. Accordingly, the distribution region of the plurality of identification parts 30 is further reduced, and the plurality of identification parts 30 are identified more easily.

Also in this case, the plurality of identification parts 30 preferably have the same posture. When the terminal part 28C bended in an up-down direction is present as with the present first modification example, it is also applicable that the identification part 30 is disposed upside down in the developed form and the identification part has the same posture as the other identification part in the up-down direction in the folding state.

Also in the first modification example, the plurality of identification parts 30 are preferably observed from the same surface side. The terminal part 28C is bended at the two bended positions L1 and L3 based on a portion of the flat wiring member 20 which is not bended but remain as it is as a base. In this case, the identification part 30 corresponding to the terminal part 28C may be provided on the terminal part 28C on the same side of the observation surface of the flat wiring member 20. That is to say, the identification part may be provided on a side opposite to the observation surface of the flat wiring member 20 in a portion bended odd number of times based on the portion of the flat wiring member which is not bended but remains as it is as a base. The identification part may be provided on the same side as the observation surface of the flat wiring member 20 in a portion bended even number of times based on the portion of the flat wiring member which is not bended but remains as it is as a base.

Figure 4:
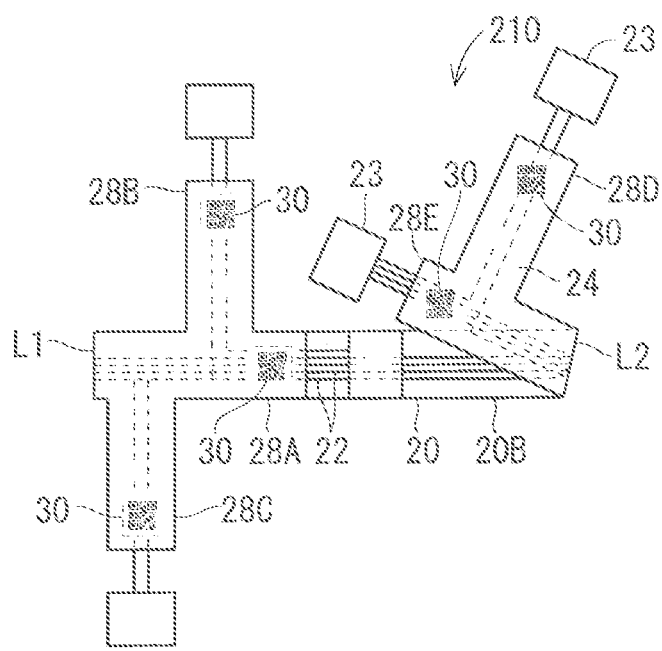
FIG. 4 is a plan view illustrating a wiring member according to a second modification example.

In a wiring member 210 according to a second modification example illustrated in FIG. 4, the bended position L2 forms a line inclined with respect to a width direction of the flat wiring member 20. Thus, the main wire part of the flat wiring member 20 is bended along the bended position L2 inclined with respect to the width direction of the flat wiring member 20. In this case, a portion of the main wire part closer to a tip portion in relation to a portion thereof obliquely bended has an oblique posture with respect to the other portion. Thus, reduced is a region where the obliquely bended portion overlaps with the other portion. Thus, the end portion of the main wire part is bended in a more compact form so as not to overlap with the other portion as much as possible. Accordingly, the flat wiring member 20 is folded to be smaller in a state where the plurality of identification parts 30 are exposed as much as possible.

The identification part 30 is preferably provided in the flat wiring member 20 so as to have the same posture as the other identification part 30 in the folding form in accordance with the bended posture.

Figure 5:
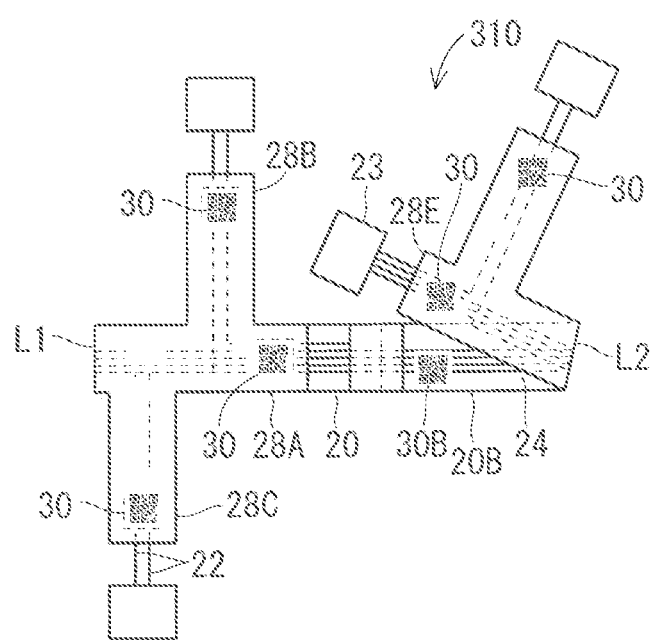
FIG. 5 is a plan view illustrating a wiring member according to a third modification example.

In the second modification example, an intermediate portion of the flat wiring member 20 with which the other portion overlaps is defined as a base portion 20B. A base identification part 30B may be provided on the base portion 20B as with a wiring member 310 according to a third modification example illustrated in FIG. 5. The base identification part 30B is a mark which does not indicate the terminal part but indicates the base portion 20B.

When the base portion 20B described above is present, it is also applicable that the wiring member 310 in the folding form is transported to and disposed in an assembly target position in a vehicle as it is, and developed on the assembly target position. In this case, the base portion 20B may be disposed on a predetermined position in the assembly target position. In consideration of this operation, when the base portion 20B is recognized by the base identification part 30I1, the wiring member 310 in the folding form can be easily transported to and disposed in the assembly target position so that the base portion 20B is located on a predetermined position in the assembly target position. A developing operation of developing the other portion, for example, can be easily performed based on the base portion 20B.

Figure 6:
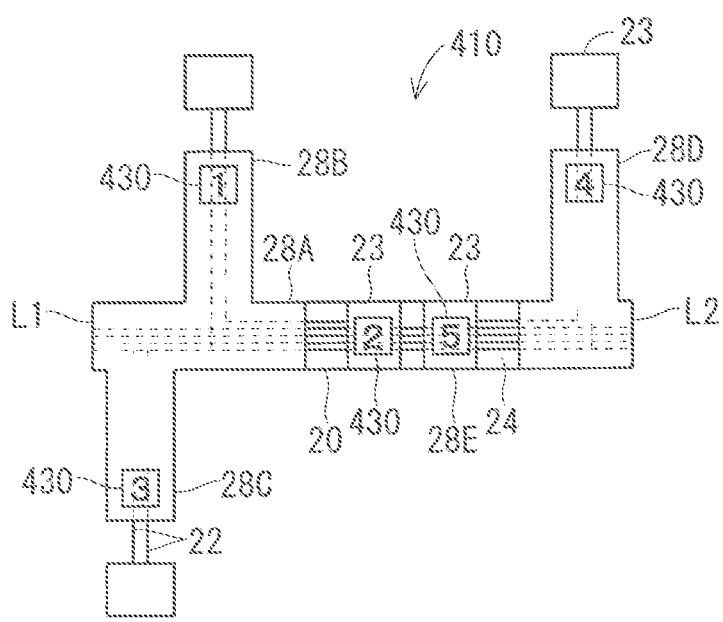
FIG. 6 is a plan view illustrating a wiring member according to a fourth modification example.

In a wiring member 410 according to a fourth modification example illustrated in FIG. 6, an identification part 430 corresponding to the identification part 30 is information which can be recognized to be different by a human, that is a label assigned with a different number herein. The number may express an operation order of the terminal parts 28A, 28B, 28C, 28D, and 28E.

According to the present modification example, when the human operates, the terminal parts 28A, 28B, 28C, 28D, and 28E can be easily identified by the identification part 430.

The image of the identification part 430 may also be captured by a camera. In this case, a computer such as an image processing device may perform pattern matching processing on the captured image to recognize the terminal parts 28A, 28B, 28C, 28D, and 28E.

The plurality of identification parts 430 may be an adhesive tape with a color. For example, when at least one of a color, a size, and the number of attachments of an adhesive tape is different in each identification part 430, it can be used as the identification part 430 for identifying the terminal parts 28A, 28B, 28C, 28D, and 28E, when the color and the size of the adhesive tape is different, the terminal parts 28A, 28B, 28C, 28D, and 28E can be identified using the identification part 430 by a human and the image processing device.

Figure 7:
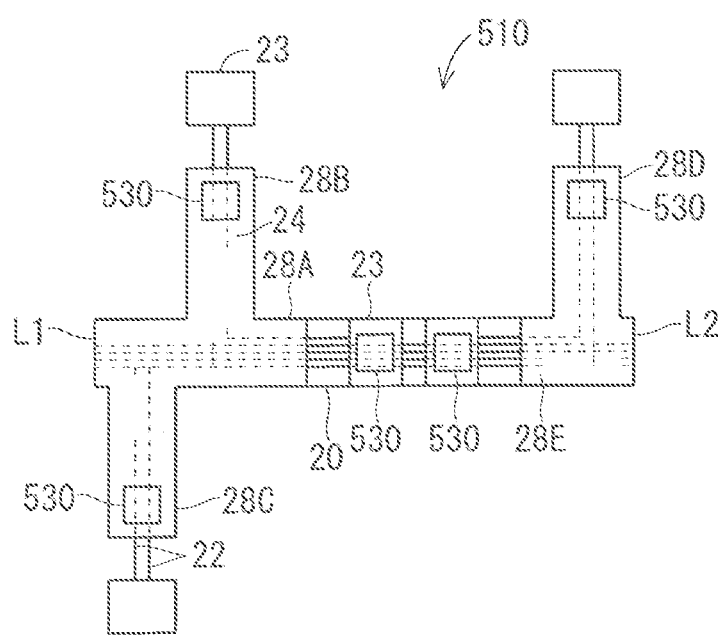
FIG. 7 is a plan view illustrating a wiring member according to a fifth modification example.

In a wiring member 510 according to a fifth modification example illustrated in FIG. 7, an identification part 530 corresponding to the identification part 30 is a wireless communication device which can store identification information and wirelessly transmit the identification information. A device referred to as a wireless tag may also be used as the wireless communication device. The wireless communication device may also be made up as an electronic chip. The identification part 530 includes, for example, a storage part 534, a transmit and receive circuit 532, and a control part 533 as illustrated in FIG. 8. The storage part 534 stores identification information regarding the terminal part. The transmit and receive circuit 532 transmits and receives a wireless signal via an antenna 531. The controller 533 includes a processor controlling the storage part 534 and the transmit and receive circuit 532 in accordance with a program which is previously stored. Then, the control part 533 transmits the identification information stored in the storage part 534 to an outer side via the transmit and receive circuit 532 and the antenna 531 in accordance with an instruction from the outer side. Accordingly, a reading device on the outer side can read out the identification information stored in the identification part 530.

For example, an operator or a robot moves the reading device near each of the terminal parts 28A, 28B, 28C, 28D, and 28E, thus the identification information of each identification part 530 can be read out to recognize each of the terminal parts 28A, 28B, 28C, 28D, and 28E. In the present modification example, the identification part 530 needs not be exposed to be observable from the outer side.

Figure 9:
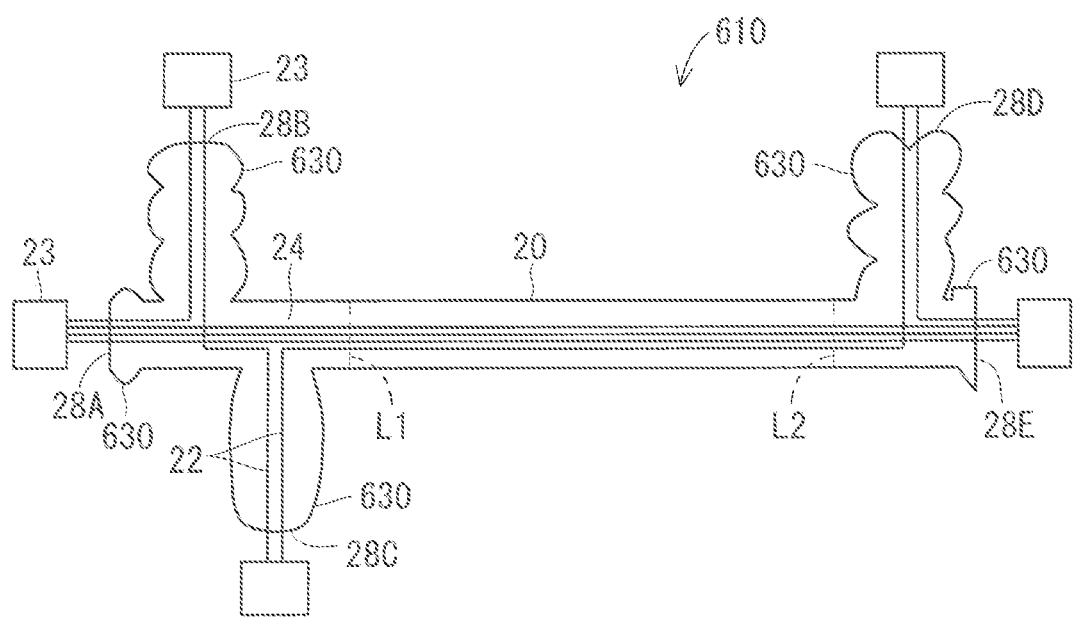
FIG. 9 is a plan view illustrating a wiring member according to a sixth modification example.

In a wiring member 610 according to a sixth modification example illustrated in FIG. 9, an identification part 630 corresponding to the identification part 30 is a type of mark provided by edge shapes of the terminal parts 28A, 28B, 28C, 28D, and 28E. That is to say, a shape of the sheet 24 of each of the terminal parts 28A, 28B, 28C, 28D, and 28E is formed to be different from each other. An edge of the sheet 24 may be formed by a curved line or a straight line. For example, a curvature radius and a size of the curved line is changed, thus the identification parts 630 each having a shape different from each other are formed.

In this case, the identification parts 28A, 28B, 28C, 28D, and 28E are identified using the identification parts 630 formed by the edge shapes of the terminal parts 28A, 28B, 28C, 28D, and 28E. The human observes the edge shapes of the terminal parts 28A, 28B, 28C, 28D, and 28E, thereby being able to identify the terminal parts 28A, 28B, 28C, 28D, and 28S. The image processing device captures images of the edge shapes described above and performs image processing, for example, thereby being able to identify the terminal parts 28A, 28B. 28C, 28D, and 28E.

Each configuration described in the embodiments and each modification example can be appropriately combined as long as they are not contradictory. For example, both a two-dimensional code which can be identified by a computer and a number may be printed in the identification part. A mark which can be captured by a camera and a wireless communication device may be used together in the identification part.

EXPLANATION OF REFERENCE SIGNS 10 wiring member
20 flat wiring member
20B base portion
22 electrical wire
23 connector
24 sheet
28A, 28B, 28C, 28D, 28E terminal part
30B base identification part
110, 210, 310, 410, 510, 610 wiring member
430, 530, 630 identification part
531 antenna
532 transmit and receive circuit
533 control part
534 storage part
E1 distribution region
E2 distribution region
L1, L2, L3 folded position

The invention claimed is:

1. A wiring member, comprising:
a flat wiring member including a plurality of terminal parts;
a plurality of identification parts provided to correspond to at least two of the terminal parts in the plurality of terminal parts, wherein
the plurality of identification parts are made to each provide a piece of identification information different from each other,
the flat wiring member is configured to change a form between a folding form in which at least a part of the flat wiring member is folded flat and a developed form in which a folding part of the folding form is developed,
the developed form is a form in which the plurality of terminal parts can be connected to various types of apparatus in a vehicle while the flat wiring member is mounted to the vehicle, and the folding form is a folded state of folding the developed form, and
the plurality of identification parts are provided in the flat wiring member; and
an area of a folding region of the flat wiring member in the folding form is smaller than an area of a developed region of the flat wiring member in the developed form,
a distribution region of the plurality of identification parts in the folding form is smaller than a distribution region of the plurality of identification parts in the developed form,
wherein
the wiring member includes a bended position inclined with respect to a width direction of the wiring member,
the plurality of identification parts is a plurality of marks that include a first mark closer to any of the terminal parts than the bended position and a second mark located on a side opposite to the first mark with respect to the bended position, the first mark is inclined with respect to the second mark in the developed form, and the first mark and the second mark have an identical posture in the folding form.

* * * * *